US008354941B2

(12) United States Patent
Wernet et al.

(10) Patent No.: US 8,354,941 B2
(45) Date of Patent: Jan. 15, 2013

(54) APPARATUS FOR DETERMINING AND/OR MONITORING AT LEAST ONE PROCESS VARIABLE

(75) Inventors: Armin Wernet, Rheinfelden (DE); Dirk Wiedmann, Rheinfelden (DE)

(73) Assignee: Endress + Hasuer GmbH + Co. KG, Maulburg (DE)

( * ) Notice: Subject to any disclaimer, the term of this patent is extended or adjusted under 35 U.S.C. 154(b) by 652 days.

(21) Appl. No.: 12/312,194

(22) PCT Filed: Oct. 15, 2007

(86) PCT No.: PCT/EP2007/060963
§ 371 (c)(1),
(2), (4) Date: Feb. 4, 2010

(87) PCT Pub. No.: WO2008/052877
PCT Pub. Date: May 8, 2008

(65) Prior Publication Data
US 2010/0132454 A1 Jun. 3, 2010

(30) Foreign Application Priority Data
Oct. 31, 2006 (DE) .......................... 10 2006 051 900

(51) Int. Cl.
*G08C 19/06* (2006.01)
(52) U.S. Cl. ........... 340/870.32; 340/870.03; 340/573.1; 340/573.12; 340/573.13; 340/573.4
(58) Field of Classification Search ............. 340/870.03, 340/870.32, 573.1, 573.12, 573.13, 573.4
See application file for complete search history.

(56) References Cited

U.S. PATENT DOCUMENTS

| 3,588,676 | A | * | 6/1971 | Tschopp | ........................... 4/310 |
| 5,837,909 | A | * | 11/1998 | Bill et al. | ................. 73/862.338 |
| 5,982,835 | A | * | 11/1999 | Kim et al. | ..................... 375/376 |
| 7,047,817 | B2 | * | 5/2006 | Lanham | ......................... 73/773 |
| 2003/0196497 | A1 | * | 10/2003 | Geilenbrugge | .......... 73/862.338 |
| 2004/0123678 | A1 | * | 7/2004 | Arai | ........................ 73/862.324 |
| 2005/0257626 | A1 | * | 11/2005 | Suzuki et al. | ............ 73/862.331 |
| 2006/0207347 | A1 | | 9/2006 | Kreuzer | |

FOREIGN PATENT DOCUMENTS

| CN | 1495983 A | 5/2004 |
| CN | 1757880 A | 11/2005 |
| DE | 2 321 900 | 11/1973 |
| DE | 27 14 195 A1 | 11/1988 |
| DE | 195 37 223 C1 | 2/1997 |
| DE | 195 42 214 C1 | 3/1997 |
| DE | 195 47 684 A1 | 6/1997 |
| DE | 196 53 522 A1 | 6/1998 |
| DE | 101 42 273 A1 | 3/2003 |
| EP | 0 707 215 A2 | 4/1996 |
| EP | 0707215 * | 4/1996 |
| EP | 0 809 222 A1 | 11/1997 |
| EP | 0 927 982 A1 | 7/1999 |

* cited by examiner

*Primary Examiner* — Jean B Jeanglaude
(74) *Attorney, Agent, or Firm* — Bacon & Thomas, PLLC

(57) ABSTRACT

An apparatus for determining and/or monitoring at least one process variable. The apparatus includes at least one, first electronics unit, at least one, second electronics unit, and at least one transferring unit. The transferring unit is arranged between the first electronics unit and the second electronics unit, and the transferring unit is embodied in such a manner, that it transmits electrical energy and data between the first electronics unit and the second electronics unit.

8 Claims, 2 Drawing Sheets

APPARATUS FOR DETERMINING AND/OR MONITORING AT LEAST ONE PROCESS VARIABLE

TECHNICAL FIELD

The invention relates to an apparatus for determining and/or monitoring at least one process variable. The apparatus includes at least one, first electronics unit and at least one, second electronics unit. The process variable can be, for example, fill level, density, viscosity, pressure, flow, e.g. flow rate, or the pH-value of a medium. The medium is, preferably, a liquid or a bulk good.

BACKGROUND DISCUSSION

In process- and automation-technology, frequently, measuring devices are used for determining and/or monitoring process variables. If the medium or the process to be monitored is located in an explosion-endangered region, then, often, galvanic isolation is required, in order to isolate the medium-contacting part of the measuring device in an explosion-endangered region (which is, most often, the process to be monitored, at least with the help of the measuring device), for example, from the energy supply part or from the servicing by operating personnel. For such purpose, measuring devices have, most often, two electronic units, between which such galvanic isolation is provided. Over this isolation, usually the necessary energy for operating the sensor unit is transmitted and also data, e.g. measurement data, wherein data is, on occasion, even transmitted in both directions. In the state of the art, there exists, for this, already a number of known options; see e.g. DE 2 321 900, EP 0 977 406 A1 or EP 0 927 982 B1. These options are, however, very complicated and costly. Another possibility is to transmit the required energy via a transformer as transfer agent and the data via opto-couplers, wherein units are provided on each side of the galvanic isolation, in order to enable bidirectional data transmission. Such a "safe isolation" consumes much space, and, because of the increased component requirements, is also expensive.

SUMMARY OF THE INVENTION

An object of the invention is, thus, to provide a galvanic isolation, which enables both the transmission of electrical energy, as well as also data, wherein, especially, the high space requirements and high costs of the state of the art are avoided.

The invention achieves this object by features including that: at least one transferring unit is provided; the transferring unit is arranged between the first electronics unit and the second electronics unit; and the transferring unit is embodied in such a manner, that the transferring unit transmits electrical energy and data between the first electronics unit and the second electronics unit.

An embodiment provides that the transferring unit is embodied in such a manner, that the transferring unit transmits data from the first electronics unit to the second electronics unit by controlling the frequency of the transmission of the electrical energy. From the primary- to the secondary-side, thus, data transmission occurs by a clocking of the energy transmission. The data, which are so transmitted from the first electronics unit to the second electronics unit, relate, in such case, for example, to measurement parameters or monitoring functions, which the second electronics unit requires for the measuring or processing of the measurement data, or it involves feedback for assuring that the first electronics unit has received the data from the second electronics unit correctly. The data direction is, thus, in this embodiment, in each case, in the direction toward a sensor unit. An opportunity for effecting the data transmission is that different frequencies correspond to different switch states, i.e. a high frequency corresponds to the reaching of a predetermined fill level, a low frequency to its subceeding, or falling beneath, wherein, in this example, the process variable is fill level.

An embodiment includes, that the transferring unit is embodied in such a manner, that the transferring unit, for transmitting a logical zero from the first electronics unit to the second electronics unit, interrupts the transmission of the electrical energy for a predeterminable time period and/or sets the electrical energy to a predeterminable value. This is, thus, a special frequency, wherein a logical zero is transmitted as an interruption of the energy transmission or as a reduction of the energy to a certain, smaller value. This clocking can, thus, also be used, in order to transmit digital ones and zeros, or, for example, to send a kind of Morse code with correspondingly long pauses or times of high level between the pauses.

An embodiment provides that the transferring unit is embodied in such a manner, that it transmits data from the first electronics unit to the second electronics unit by transmitting the electrical energy in the form of an electrical, alternating voltage and modulating the frequency of the alternating voltage in accordance with the data. Here, involved, quite specially, is the transmission of an alternating voltage, whose frequency itself bears the information to be transmitted. For example, different frequencies are associated with different information or the frequency itself is the information, when, for example, the process variable causes a frequency change.

An embodiment includes, that the transferring unit is embodied in such a manner, that it transmits data from the second electronics unit to the first electronics unit transmits by modulating, in accordance with the data, the electrical current, which the second electronics unit gets from the first electronics unit. In this embodiment, the information transfer is from the secondary- to the primary-side. This transmission is done in such a manner that, on the secondary-side, the electrical current requirement is modulated as a function of the information to be transmitted, i.e. the primary-side notices, that, on the secondary-side, in each case, another electrical current requirement exists. Corresponding to an agreed protocol, thus, information is transmitted to the primary-side.

An embodiment includes, that the transferring unit is embodied in such a manner, that it serves as galvanic isolation between the first electronics unit and the second electronics unit.

An embodiment provides, that at least one sensor unit is provided, which is connected electrically with the second electronics unit. The second electronics unit is, thus, in the measuring device, a part of the actual sensor component responsible for performing the measuring and producing a measuring signal. The first electronics unit provides, in contrast, the interface for the user, as regards energy, data or also on-site-servicing.

An embodiment includes, that the transferring unit includes at least one transformer.

An embodiment provides that, in the second electronics unit, at least one buffer capacitor is provided for storing electrical energy. This buffer capacitor is especially advantageous, when the energy transmission from the primary-side is interrupted for transmission of a logical zero.

An embodiment includes, that the transferring unit is embodied in such a manner, that it performs synchronization before a transmission of data. Preferably, synchronization is performed, when data are transferred from the second electronics unit as transmitter to the first electronics unit as receiver, since this occurs via modulation of the electrical current. The synchronization is thus executed in such a manner, that especially the receiving side is switched to "ready to receive". Preferably, synchronization, thus the coordination between transmitter and receiver, is performed before each data transmission, preferably, however, only for transmission from the second to the first electronics unit. Especially, there is located in each electronics unit a processor for control of data transmission.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
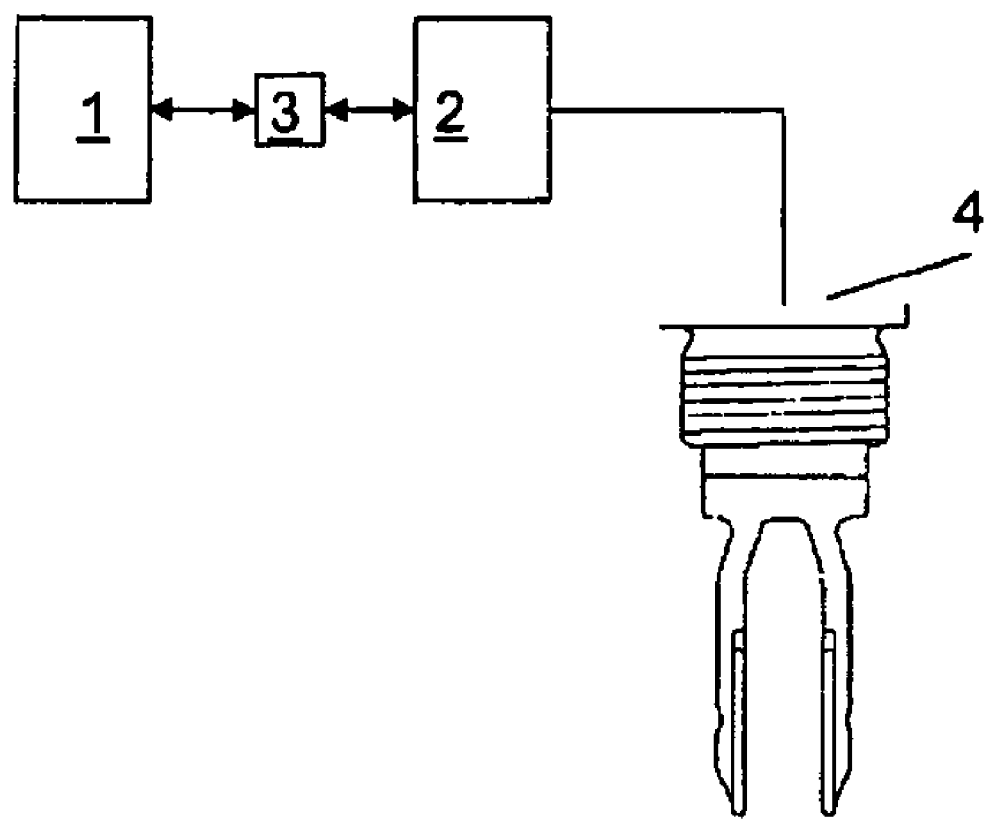
FIG. 1 a schematic drawing of the measuring device of the invention.

FIG. 1 shows a measuring device of the invention in principle, wherein, here, the sensor unit 4 is, for example, a so-called oscillatory fork. In other embodiments, sensor unit 4 can be, for example, a capacitive probe or a pH-electrode or a microwave antenna or a pressure measuring cell or a temperature probe or a flow measuring device. The present invention concerns the transmission of energy and information and does not depend on the type of measuring.

The measuring device is composed of a first electronics unit 1 and a second electronics unit 2. The second electronics unit 2, which is also referred to as the "front-end", is connected with the sensor unit 4 and supplies such, for example, with a measuring signal. In the, here, illustrated example, the second electronics unit 2 provides the oscillatory fork 4 with an alternating voltage, which is converted by the fork 4 into mechanical oscillations. Furthermore, the second electronics unit 2 receives the signals of the sensor unit 4. The received signals are, likewise, in the form of an alternating voltage, which depends on variables such as fill level, density or viscosity of the medium, with which the oscillatory fork 4 comes in contact. More generally formulated: The second electronics unit 2 is arranged in the direction of the process or medium to be measured or monitored and performs at least a part of the core tasks of the measuring, such as the producing of a sampling signal and the receiving, further processing and/or evaluation of a measurement signal of the sensor unit 4.

In the first electronics unit 1, preferably, the energy supply is implemented, however, also the input/output of measured data, switch state or measurement parameters.

In many applications, it is required, that a galvanic isolation, or "safe" galvanic isolation, exist between the two electronic units 1, 2. This can be required for functional or safety reasons. As isolation, a transformer can be used, via which, for example, the electrical energy/power is transferred. At the same time, on occasion, it is also required that information/data be transferred between the two units 1, 2, wherein this information transfer must not cancel the galvanic isolation. For this purpose, for example, opto-couplers are used. If it is, moreover, required, that not only measurement data be transferred from the second electronics unit 2 to the first electronics unit 1, but, also, that measurement parameters or monitoring functions be transmitted to the second electronics unit 2 or that a confirmation of the measurement data occur by a sending of such back, then opto-couplers are required in both electronic units 1, 2, which, on the one hand, brings about extra costs and, on the other hand, requires extra space. The data to be transmitted can be composed of both binary signals, as well as also a serial protocol.

Figure 2:
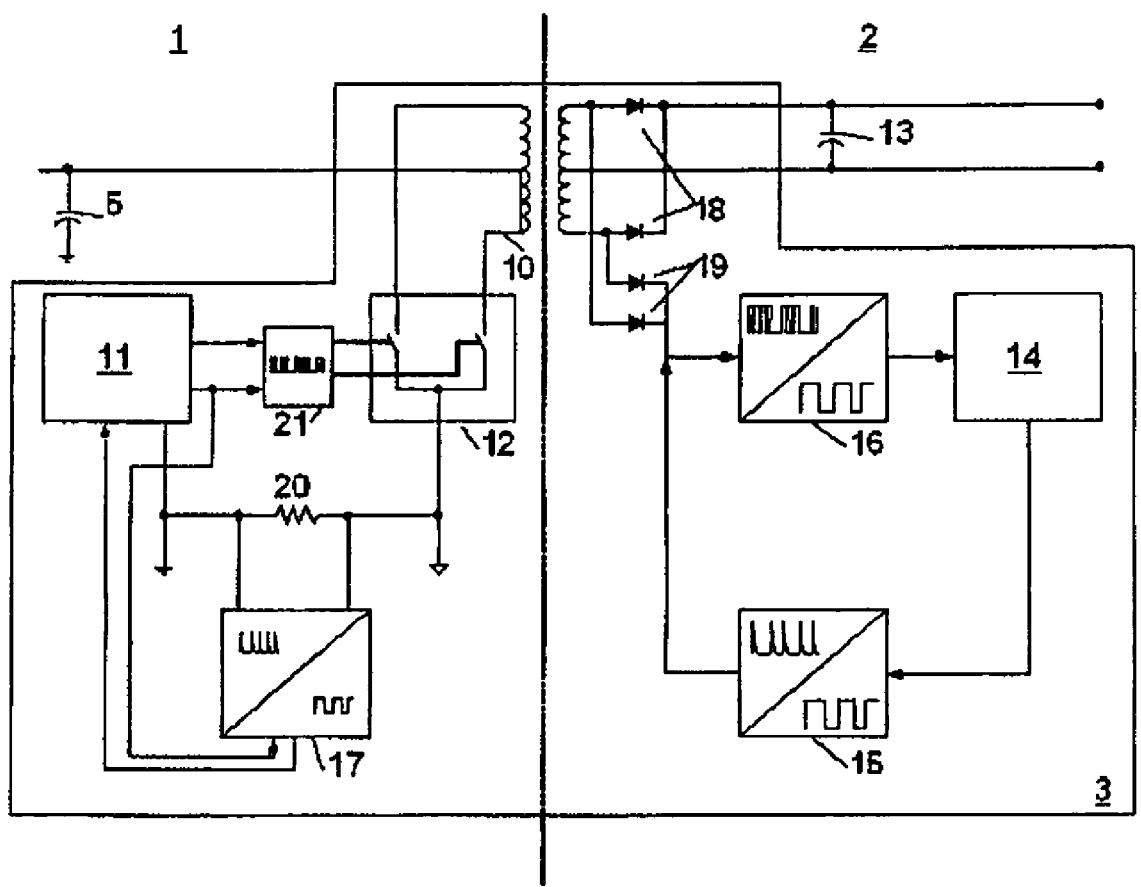
FIG. 2 a detailed drawing of the measuring device of FIG. 1.

In the state of the art, thus, for example, a transformer is used for the energy transmission and two opto-couplers for the data transmission. These expenses and high space requirements are avoided by the measuring device of the invention by providing energy- and data-transmission via one transferring unit 3, with the data transmission being possible even in both directions. The transferring unit 3 is, in one embodiment (FIG. 1), separate from both electronic units 1, 2 and, in a second embodiment (FIG. 2), is partially a component of each of the two electronic units 1, 2. In FIG. 2, quasi, the driver for transmission of the data is, in each case, a component of the electronics unit that wants to transfer the data, and common to both electronic units is the transformer as actual transmitter.

In the invention, in such case, the transmission of the data, or information, is superimposed on the transmission of the energy, so that, quasi, the energy bears the information. A practical example is shown in FIG. 2.

In FIG. 2, for example, the electrical energy is transmitted through a transformer 10, as galvanic isolation, from the first electronics unit 1 to the second electronics unit 2.

In order, likewise, to transmit information from the first electronics unit 1 to the second electronics unit 2, the power transmission is clocked through the transformer 10. For this, a first processor 11 is provided, which, corresponding to the information to be transferred and to a protocol agreed with the second electronics unit 2, controls the power transmission via a switch 12. A logical zero can be transmitted, for example, by transferring, for a short-time, no electrical energy. In order that, in this case, the second electronics unit 2 can still work, on the one hand, the period of time is kept as brief as possible, and, on the other hand, a buffer capacitor 13 is provided in the second electronics unit 2. Thus, information is transmitted from the first electronics unit 1 to the second electronics unit 2 through modulation of the electrical energy being transmitted. In such case, preferably, the level of the energy is modulated, for example, it is set to zero for intermediate times. In an additional embodiment, an electrical alternating voltage is used, whose frequency is varied corresponding to the data to be transmitted.

In the case of the second electronics unit 2, information is transmitted to the first electronics unit 1 by varying the electrical current requirement, i.e. different levels of electrical current are "drawn". For this, a second processor 14 is provided in the second electronics unit 2, or in the part of the second electronics unit 2 at the transferring unit 3. This second processor 14 sends a signal to an electrical current modulator 15, which, for short time periods, with spike pulses, increases the electrical current requirement of the secondary-side of the transformer 10. Depending on the clocking of the electrical current requirement, thus, information is transmitted to the primary-side, i.e. into the first electronics unit 1. The increased electrical current requirement is, in such case, also produced only for a short time, in order to prevent overloading, or losses, as the case may be. In an additional embodiment, the electrical current requirement sinks for a short time to a predetermined level. Shown is, furthermore, that the modulation of the energy transmitted via the transformer 10 reaches the second processor 14 via a demodulator 16.

A description of FIG. 2 with respect to details of the technology is as follows:

The unit 11, e.g. a processor, produces a rectangular signal for operating a DC/DC converter, which, in an additional embodiment, is a discrete, astable multivibrator. On the secondary side 2, the signal is rectified via the rectifying diodes 18 and smoothed and stored in the buffer capacitor 13. The buffer capacitor 5 on the primary page 1 delivers the pulse currents required for the DC/DC-conversion and holds the input voltage almost constant. Additionally, in the unit 11, information, or protocol, to be transmitted is generated and modulated onto the transferring unit 10 via the modulator 21. The internal logic locks, in the case of transmission of a logical zero, the two switching transistors. In such case, it must be assured, that, in the case of very many logical zeros, or after the end of a communication-cycle, the locking is canceled, in order to refresh the charge in the buffer capacitor 13 in the second electronics unit 2. The rectifying unit 19 feeds the modulated signal to a demodulator 16, which conditions the sent data for the receiving unit in the processor 14. In the case of transmission from the second electronics unit 2 to the first electronics unit 1, as a function of the information to be transmitted, short electrical current pulses are modulated on by the modulator 15. The modulation occurs at the cathodes the rectifying diodes 19. The rectifying diodes 18 on the secondary-side of the transformer 10 act during the electrical current modulation as decoupling diodes and guarantee, that the modulated electrical current flows via the transmitter 10 and cannot be removed by the buffer capacitor 13. In this embodiment, each state change from "Low" to "High", or from "High" to "Low", corresponds to an electrical current pulse. On the primary-side of the transformer 10, this electrical current information can be coupled out at the electrical current/voltage converter 20 and conditioned in the demodulator 17, which is essentially composed of a D-flip-flop, for further processing in the processor unit 11.

Through EMC-effects (e.g. burst- or surge pulses), disturbances can occur in the communication, in that e.g. an electrical current pulse falls above or below where it should be. In order to assure, that the signal is not durably inverted or corrupted by disturbances, before each information exchange from the second electronics unit 2 to the first electronics unit 1, a synchronizing of the D-flip-flop in the demodulator 17 is performed. This signal can be taken directly from the transmission line acting on the modulator 21 and can be applied to the Preset of the flip-flop.

In practice, a capacitor is connected in parallel with the electrical current-voltage converter 20, for filtering out disturbances caused by short transients.

The transmission of energy and data according to the invention occurs, thus, by modulating the energy transmitted from the one to the other side with respect to time (i.e. frequency modulation of the energy sent from the first electronics unit 1) and, the other way around, altering the electrical power drop with respect to time (i.e. changing the electrical current drawn by the second electronics unit 2).

The invention claimed is:

1. An apparatus for determining and/or monitoring at least one process variable, comprising:
    at least one, first electronics unit;
    at least one, second electronics unit; and
    at least one transferring unit, wherein:
    said at least one transferring unit is arranged between said at least one first electronics unit and said at least one second electronics unit;
    said at least one transferring unit is embodied in such a manner, that it transmits electrical energy and data between said at least one first electronics unit and said at least one second electronics unit;
    said at least one transferring unit is embodied in such a manner, that it transmits data from said at least one first electronics unit to said at least one second electronics unit by controlling frequency of transmission of the electrical energy; and
    said at least one transferring unit is embodied in such a manner, that, for transmitting a logical zero from said at least one first electronics unit to said at least one second electronics unit, said at least one transferring unit interrupts transmission of electrical enemy for predeterminable time period and/or sets the electrical energy for a predeterminable time period.

2. The apparatus as claimed in claim 1, wherein:
    said at least one transferring unit is embodied in such a manner, that it transmits data from said at least one first electronics unit to said at least one second electronics unit by transmitting the electrical energy in form of an electrical, alternating voltage and by modulating frequency of the alternating voltage in correspondence with the data.

3. The apparatus as claimed in claim 1, wherein:
    said at least one transferring unit is embodied in such a manner, that it transmits data from said at least one second electronics unit to said at least one first electronics unit by modulating electrical current, which said at least one second electronics unit draws from said at least one first electronics unit, in correspondence with the data.

4. The apparatus as claimed in claim 1, wherein:
    said at least one transferring unit is embodied in such a manner, that it serves as galvanic isolation between said at least one first electronics unit and said at least one second electronics unit.

5. The apparatus as claimed in claim 1, further comprising:
    at least one sensor unit, which is connected electrically with said at least one second electronics unit.

6. The apparatus as claimed in claim 1, wherein:
    said at least one transferring unit includes at least one transformer.

7. The apparatus as claimed in claim 1, further comprising:
    at least one buffer capacitor in said at least one second electronics unit for storing electrical energy.

8. The apparatus as claimed in claim 1, wherein:
    said at least one transferring unit is embodied in such a manner, that it performs synchronization before transmission of data.

* * * * *